SLIDE-IN STYLUS ASSEMBLIES

Filed Oct. 13, 1955

INVENTOR:
MARK E. WOODWORTH,
BY Donald N. Timlie
HIS ATTORNEY.

United States Patent Office 2,820,854
Patented Jan. 21, 1958

2,820,854

SLIDE-IN STYLUS ASSEMBLIES

Mark E. Woodworth, Manlius, N. Y., assignor to General Electric Company, a corporation of New York Application October 13, 1955, Serial No. 540,220
18 Claims. (Cl. 179—100.41)

This invention relates to improved styli supports for dual-play phonograph pickup heads, particularly of the variable reluctance type.

In the patents to E. O. Peterson et al., No. 2,554,208, and to C. R. Miner et al., No. 2,554,209, both issued May 22, 1951, and assigned to the assignee of the present invention, there are disclosed phonograph pickups of the reluctance type in which a stylus is mounted on the end of a cantilever arm. Each pickup has a pair of pole pieces in a magnetic field arranged on opposite sides of the cantilever arm so that as the stylus follows the phonograph record grooves, the relative flux flowing from the cantilever arm to the respective pole pieces is varied accordingly. Means are provided, as described in greater detail in these patents for developing an electrical signal in response to the changes in flux flowing to the respective pole pieces. The stylus provided in this and similar phonograph pickups may be a precious jewel shaped to ride properly in the record groove. However, due to the abrasive action of the material of which the record is formed, the stylus tip may no longer have its desired shape after a number of these records have been played. This situation, of course, arises in phonograph pickups of all types and accordingly it is a common practice to provide a supporting structure for the stylus which makes it possible to replace it when worn.

Known supporting structures while effective for this purpose fail to attain all desirable objectives. Some desirable features of a stylus supporting means are that: It be of such construction that the average user can change stylus without the need of special tools or special skills; the cost involved in the replacement should be at a minimum; in dual-play pickups it should be possible to replace only one of a pair of styli as desired; the weight of the supporting structure should be at a minimum in order to retain or enhance the characteristics and quality of performance; and an improved stylus supporting structure should be usable in those pickups already on the market in order that a new pickup need not be purchased.

Therefore, it is an object of this invention to provide a novel phonograph styli supporting structure wherein only one of at least a pair of styli and its directly related supporting structure need be replaced as desired.

It is another object of this invention to provide a novel phonograph stylus supporting structure in which a simple means is provided to accurately position and securely hold a stylus so that a replacement can be made by a relatively unskilled person without the aid of any special tool.

It is still another object of this invention to provide a novel replaceable stylus supporting structure which supporting structure is kept to a minimum so that a replacement of a stylus does not require the removal of an excessive amount of the pickup head and its structure.

It is a further object of this invention to provide a novel stylus supporting structure which is capable of utilization with large numbers of phonograph pickup heads presently in use and which when so used do not decrease the output or harm the qualities of the pickup head.

Briefly, in accordance with my invention, I provide a stylus support holder comprising a post which has a channel member mounted on one end. The channel is secured to the post and extends transversely of the longitudinal axis thereof. If desired, the channel may be made to extend on either side of the post axis and may receive in each of its ends a stylus support assembly. The stylus support assembly includes an elongated base dimensioned so as to be firmly held in the channel by virtue of a frictional fit between it sides and the wall of the channel. Means are also provided to accurately position the stylus support in the channel. Mounted at one end of the elongated base is a cantilevered arm which supports a phonograph stylus at its free end. Positioned between the cantilevered arm and its base I provide suitable damping blocks for the arm as determined by its configuration. In this arrangement the post may be mounted in a phonograph pickup head and retained by any suitable means. The post may be mounted in such a manner that if plural styli supports are provided, it may be moved by rotation to bring either stylus into its proper playing position.

The features of my invention which I believe to be novel are set forth with particularly in the appended claims. My invention itself, however, both as to its structure and its method of assembly, together with further objects and advantages thereof, may best be understood by reference to the following description taken in connection with the accompanying drawings in which:

Figure 1:
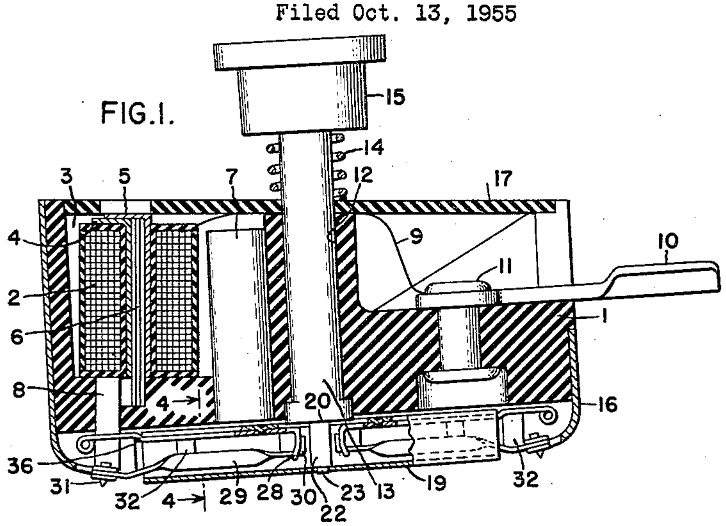
Figure 1 is a sectional side view of a phonograph pickup in which my novel stylus support assembly is employed.
Figures 2, 3, 4:
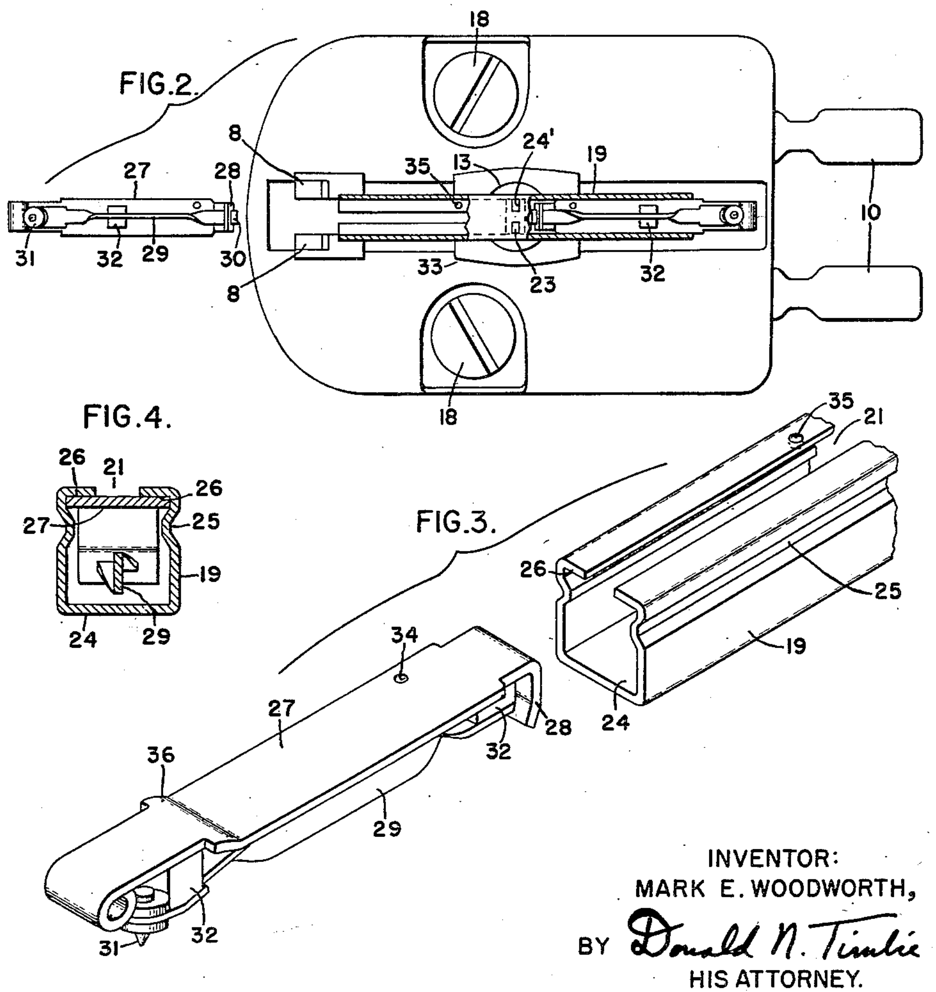
Figure 2 is an exploded bottom view of the phonograph pickup employing my novel stylus support assembly.
Figure 3 is an exploded perspective view of the channel and stylus support forming a part of my novel arrangement.
Figure 4 is a view along the line 4—4 of Figure 1 illustrating how cooperating elements of my stylus support engage each other.

Figures 1 and 2 represent a phonograph pickup with which my novel styli supports are adapted to be used. The phonograph pickup is of the variable reluctance type disclosed in the patent to Miner et al., referred to above. It includes a unitary support member 1, which may be formed of any suitable plastic insulating material. A pair of coils 2, only one of which is shown; are supported in a recess 3 formed in the support member 1. The coils 2 surround different legs of a pair of magnetic yoke members 4, 5 and a plurality of magnetic laminations 6 are positioned between the yoke members. A permanent magnet 7 mounted in the support member 1 provides a magnetic flux which transverses the region of the coils 2. A pair of pole pieces 8 depend from the yoke members 4 and 5 below the coils 2 and the support member 1.

The coils are connected in series and are electrically connected by a pair of conductors 9 to a pair of output terminals 10. The terminals 10 are secured to the base member 1 by means of rivets 11, or the like. The structure, electrical circuitry, and mode of operation of this device are explained in greater detail in the patent to Miner et al. referred to above.

The support member 1 is provided with a vertically extending opening 12. Journalled vertically in the opening 12 is a post member 13. Post member 13 is biased to an upward position by means of a helical spring 14 which is positioned around the post, the upper end of which is retained by means of a C-shaped washer (not shown), which may be snapped into place in a groove (not shown) provided on the upper end of the post 13. The upper end of the post 13 is surmounted by an operating knob 15 which may be retained thereon as by a suitable friction type engagement.

A metallic case 16 surrounds the support member 1 to house the operative elements of the pickup head. A cover 17, which includes an aperture for the post 13, closes the top of the pickup head to protect the structure within from dust and other harmful substances. The cover 17 may be secured to the case 16 by any suitable means such as bent over tabs (not shown). In order that the pickup may be attached to the tone arm of a record player, there is provided a pair of screws 18 which extend through apertures provided therefor in the support member 1.

The following discussion is made with reference to the figures of the drawing as convenient. In order to provide an individually, interchangeable dual-stylus supporting assembly in accordance with my invention, a channel member 19 is provided on the bottom of the post 13. In the illustrated embodiment, the channel member 19 is shown as extending to either side of the longitudinal axis of the post 13. It is obvious, however, that if desired, the channel member may extend only to one side of the post if it is desired to use the stylus supporting assembly in a pickup head of the single play type. The channel member 19 is secured at its center 20 to the post 13 so that when in its assembled position in the pickup head, it presents an upwardly directed opening 21, as illustrated in Figure 4. A positioning projection 22 on the bottom of the post 13 extends through cooperating openings in the channel 19 and carries studs 23 which extend through opening 24′ in a web 24 of the channel member 19 to accurately position the channel on the post. A ridge is formed by a depression or groove 25, or the like, as seen in Figures 3 and 4, in each side of the channel member 19 so that the channel member presents interior gripping portions 26 which extend from each end of the channel member 19 a point adjacent its center 20. The function of these interior gripping positions will be described in detail hereinafter.

Figure 3 of the drawing illustrates in detail a slidable stylus support which may be mounted in either end of the channel member 19. The support comprises an elongated flat base 27. At one end of the base there is provided a downturned tab 28 which has secured thereto a cantilevered stylus-carrying arm 29. As may be best seen in Figure 1, arm 29 may be secured to the tab 28 by means of the bent-over end 30 which extends through a groove in the bottom of the tab 28 and is bent over on the side of the tab 28 nearest the projection 22 and is secured to the tab by solder or other suitable means. The twisted ribbon configuration of the arm 29 shown in this figure is by way of illustration only and may assume any desired shape. It is apparent to those skilled in the art that the arm may be secured to the base by any means found desirable. At its free end the cantilevered arm is provided with a record engaging stylus 31 which is mounted thereon by any suitable means. The stylus may be of any type including a semi-permanent structure and may comprise a jewel such as a sapphire. Small blocks 32 of a damping material such as a cellulose nitrate plastic or a similar material are disposed between the arm 29 and base 27 to damp the cantilevered arm 31 in those places found convenient or necessary as determined by the configuration of the arm.

In the use of the stylus support structure herein described, the stylus support holder, that is, the post 13 and its attached channel 19 are mounted in the pickup by passing the post through the opening 12. The retaining elements referred to above are assembled to hold the post in position and the knob 15 may be placed over its upper end. If it is found necessary to provide means for holding the channel 13 and associated stylus in their proper playing position, suitable guides may be formed on the lower surface of the pickup in Figure 2. When it is desired to change styli, as records having different width grooves are played, the knob 15 is depressed so that the channel 19 is below the bottom surface of the pickup. The knob 15 may then be rotated and with it the post 13 and channel 19 to bring the desired stylus into its playing position.

This invention permits replacement of the individual styli by depressing the knob 15 and stylus support holder below the level of the pickup bottom. The stylus support assembly including 27 and attached structure can be replaced by manually removing it from the channel. A new support assembly including the base 27, arm 29 and stylus 31 is then inserted. When the support is so inserted the longitudinal sides of the base 27 engage in the interior gripping portions 26. The base may be provided with portions, which in this form are constituted by the sides of the base 27, which are of such a dimension that when it is inserted, it will be retained therein by the force developed as the side walls of the channel member press on them. If desired, the base 27 and the channel 19 may be provided with cooperating detents 34 and 35, respectively, to position and hold the base. Alternatively, another portion of the base may have a shoulder 36 to limit its movement into the channel 19.

It will be appreciated that when the base 27 is in the channel 19, its longitudinal sides are frictionally engaged securely by the side walls of the channel so that it is capable of little or no movement and forms a firm base on which to support the stylus arm 31 which is formed as a thin flexible reed. Also, the channel is dimensioned so as to provide the necessary clearance for the vertical and horizontal movements of the arm 29 and to permit the provision of the necessary damping blocks such as shown at 32.

In the illustrated embodiment the arm or arms 29 are formed as a twisted ribbon of a suitable magnetic material. The channel member 19 and base 27 form no part of the magnetic circuit of the pickup but are rather composed of a non-magnetic material so that they divert none of the flux which passes between the magnet 7 and pole pieces 8 by means of the arm or arms 29. In developing the electrical signals, the stylus 31 is vibrated upon engagement with the groove of a record to be reproduced. The arm 31 is normally centered between the pole pieces 8, associated with yoke and laminations 4, 5 and 6 within the coils 2. Any changes in its position relative to the pole pieces 8 changes the flux flow in the coils 2 causing an output signal to be developed.

From the foregoing it can be seen that a stylus support and stylus support holder constructed in accordance with this invention can be substituted for the old stylus support assembly in existing pickups. After such a substitution, further replacements can be effected by the removal of the old stylus support from the channel member and the insertion of a new one. This can be accomplished by a relatively unskilled person without the aid of tools. The replacement involves a minimum of structure thereby holding the cost down. In dual-play pickups only one stylus need be replaced at a time. The construction is also such that it can be utilized in a variety of pickups including single and dual-play varieties.

While the invention has been described by reference to a particular embodiment thereof, it will be understood that numerous modifications may be made by those skilled in the art without departing from the invention. I therefore aim in the appended claims to cover such equivalent narrations as come within the true spirit and scope of my invention.

What I claim as new and desire to secure by Letters Patent of the United States is:

1. In a magnetic phonograph pickup of the variable reluctance type including a pair of downwardly depending pole pieces, a styli support holder comprising, a straight open ended channel member of non-magnetic material removably and pivotally mounted on the bottom of said pick-up and extending transversely in two directions from the pivotal axis thereof, a pair of elongated bases formed from a non-magnetic material, one base being slidably mounted in each end of said channel member, means provided on said channel member to grip portions of each base to retain them in said channel member and hold them in a fixed position, means on said bases to limit their movement into said channel member whereby a portion of each base extends beyond its respective end of said channel member, said portion of one base being disposed between the pole piece when the styli support and support holder are mounted in the pickup, each base having a cantilever flexible arm of magnetic material mounted on a portion disposed in channel member and extending to the portion of its respective base disposed beyond the ends of the channel member, the free end of the cantilever arm having a portion disposed between the pole pieces, a stylus mounted on the free end of each cantilever arm, and damping means positioned between and engaging each arm and base.

2. A replaceable stylus combination comprising: a post, a channel member secured to one end of said post and extending transversally to the longitudinal axis thereof, at least one stylus support assembly comprising a non-magnetic base slidably mounted into said channel member, said channel member and said non-magnetic base having interengaging portions whereby said base can be frictionally retained within said channel member, stop means on said base for engaging said channel member for limiting the amount by which said base can be inserted whereby a first portion of said base can be inserted into said channel member and a second portion then extends from the end of the channel member, and a flexible magnetic cantilever arm mounted on said first portion to extend toward said second portion of said base, the free end of said cantilever arm being suitable for mounting a stylus thereon.

3. A replaceable stylus combination including a stylus support holder and a stylus support assembly, wherein said stylus support holder comprises: a post, a channel member having two sides and a bottom so as to form a general U-shape cross-section, each of said sides having an inwardly extending shoulder along the edge of the side at the top of the U and having an inwardly extending projection adjacent and in parallel relationship with said shoulder so that an interior gripping portion is formed between the shoulder and projection of each side, and means for securing said channel in orthogonal relationship to one end of said post; and wherein said stylus support assembly comprises: an elongated non-magnetic base having a width slightly greater than the distance between the two interior gripping portions of said channel member so that when said assembly is inserted into said channel member, it is retained by frictional engagement, means on said base for limiting the amount of insertion into said channel member, a flexible magnetic cantilever arm mounted at one end of said base in parallel relationship alongside said base, the free end of said flexible arm being adapted for mounting a stylus thereon, and damping means positioned between said arm and said base.

4. A replaceable stylus combination comprising: a post adapted to be removably mounted in a phonograph pickup cartridge of the variable reluctance type, a channel member secured to one end of said post and extending transversally to the longitudinal axis thereof, at least one stylus support assembly slidably mounted into said channel member, said channel member and said assembly having interengaging portions whereby said assembly can be frictionally retained within said channel member, said assembly having a longitudinally extending non-magnetic base, and a flexible magnetic cantilever arm mounted at one end on said assembly to extend alongside and in substantially parallel relationship with said base, and a record engaging stylus mounted on the free end of said cantilever arm.

5. A stylus support assembly adapted for slide-in retention in a stylus support holder, said assembly comprising: an approximately rectangularly-shaped base constructed of non-magnetic material, a tab at one end of said base extending at an angle of approximately 90 degrees with the plane of said base, and a flexible magnetic cantilever arm mounted on said tab to extend alongside and in substantially parallel relationship with said base, the free end of said cantilever arm being suitable for the mounting of a stylus thereon.

6. The stylus support assembly of claim 5 and damping means mounted between and engaging said base and said arm.

7. The stylus support assembly holder of claim 6 and means on said base for limiting the amount of insertion so that one end of said base extends from said holder when said assembly is inserted into said holder.

8. A stylus support assembly comprising: an elongated base of non-magnetic material having two parallel sides forming at least a portion of the long sides of said base, a tab extending approximately perpendicular from one end of said base, and a flexible magnetic cantilever arm mounted on said tab to extend alongside and in substantially parallel relationship with said base, the free end of said cantilever arm being suitable for the mounting of a stylus thereon.

9. The stylus support assembly of claim 8 wherein the width of said base at all points along its long sides is no greater than the distance between said two parallel sides, and wherein the width of said tab is less than the distance between said two parallel sides.

10. The stylus support assembly of claim 9 and damping means mounted between and engaging said base and said arm.

11. The stylus support assembly of claim 10 wherein said tab and said base are of a one-piece construction.

12. A magnetic phonograph pick-up of the variable reluctance type including a pair of spaced-apart pole pieces, an open ended channel member mounted on the bottom of said pick-up and extending in the direction of said pole pieces, at least one base of non-magnetic material slidably and removably mounted in said channel member, means provided on said channel member to grip portions of said base to retain it in said channel member in a fixed position, a flexible cantilever arm of magnetic material mounted on said base to extend along side and in substantially parallel relationship with said base, the free end of said cantilever arm being disposed between said pole pieces, and a record engaging stylus mounted on the free end of said cantilever arm.

13. The combination set forth in claim 12 further characterized by damping means mounted between and engaging said arm and said base.

14. The combination set forth in claim 4 further characterized by damping means mounted between and engaging said base and said arm.

15. In a magnetic phonograph pick-up of the variable magnetic reluctance type having a pair of spaced apart pole pieces, open ended channel member pivotally mounted on the bottom of the pick-up and extending transversely in two directions from the pivotal axis thereof, a pair of bases formed from non-magnetic material, one base being slidably and removably mounted in each end of said channel member, means provided on said channel member to grip portions of each base to retain them in said channel member, a flexible cantilever arm of magnetic material mounted on each base to extend along side and in substantially parallel relationship with said base, the free end of each cantilever arm being disposed between the pole pieces, and a record engaging stylus mounted on the free end of each cantilever arm.

16. The magnetic phonograph pick-up set forth in claim 15 further characterized by damping means mounted between and engaging each base and the respective cantilever arm thereof.

17. In a magnetic phonograph pick-up of the variable reluctance type which includes a pair of spaced apart pole pieces and an open-ended channel member mounted on the bottom of the pick-up and extending in the direction of the pole pieces, the combination comprising at least one substantially flat base of non-magnetic material for slidable insertion and frictional retention in such open-ended channel member, a flexible cantilever arm of magnetic material mounted on said base to extend along side and in substantially parallel relationship with said base, the free end of said cantilever arm being disposed between such pole pieces upon said base being inserted in such channel member, and a record engaging stylus mounted on the free end of the cantilever arm.

18. The combination set forth in claim 17 further characterized by damping means mounted between and engaging said arm and said base.

References Cited in the file of this patent

UNITED STATES PATENTS

| | | |
|---|---|---|
| 2,320,427 | Guedon | June 1, 1943 |
| 2,553,492 | Weil | May 15, 1951 |
| 2,554,208 | Peterson et al. | May 22, 1951 |
| 2,554,209 | Miner et al. | May 22, 1951 |
| 2,622,156 | Baker | Dec. 16, 1952 |
| 2,639,156 | Ward | May 19, 1953 |
| 2,699,470 | Koren | Jan. 11, 1955 |
| 2,742,295 | Frederick | Apr. 17, 1956 |

FOREIGN PATENTS

| | | |
|---|---|---|
| 304,081 | Switzerland | Mar. 1, 1953 |